(12) United States Patent
Suzuki (10) Patent No.: US 11,148,716 B2
(45) Date of Patent: *Oct. 19, 2021

(54) STEERING ASSISTANCE DEVICE AND STEERING ASSISTANCE METHOD

(71) Applicant: ISUZU MOTORS LIMITED, Tokyo (JP)

(72) Inventor: Teruhiko Suzuki, Ayase (JP)

(73) Assignee: ISUZU MOTORS LIMITED, Tokyo (JP)

(*) Notice: Subject to any disclaimer, the term of this patent is extended or adjusted under 35 U.S.C. 154(b) by 350 days.

This patent is subject to a terminal disclaimer.

(21) Appl. No.: 16/322,896

(22) PCT Filed: Jul. 27, 2017

(86) PCT No.: PCT/JP2017/027296
§ 371 (c)(1),
(2) Date: Feb. 1, 2019

(87) PCT Pub. No.: WO2018/025750
PCT Pub. Date: Feb. 8, 2018

(65) Prior Publication Data
US 2020/0180694 A1    Jun. 11, 2020

(30) Foreign Application Priority Data

Aug. 2, 2016 (JP) .............................. JP2016-152052

(51) Int. Cl.
*B62D 15/02* (2006.01)
*B60R 11/04* (2006.01)
*G06K 9/00* (2006.01)

(52) U.S. Cl.
CPC ............ *B62D 15/025* (2013.01); *B60R 11/04* (2013.01); *G06K 9/00798* (2013.01)

(58) Field of Classification Search
CPC ... B62D 15/025; B60R 11/04; G06K 9/00798
(Continued)

(56) References Cited

U.S. PATENT DOCUMENTS 5,283,741 A * 2/1994 Desrus ................ B62D 5/0457
                                                        180/422
6,185,492 B1   2/2001 Kagawa et al.
(Continued)

FOREIGN PATENT DOCUMENTS

CN          101965286 A       2/2011
CN          109562787 A       4/2019
(Continued)

OTHER PUBLICATIONS

Notification of the First Office Action for related CN App No. 201780047828.4 dated Nov. 27, 2020, 14 pgs.
(Continued)

*Primary Examiner* — Krishnan Ramesh
(74) *Attorney, Agent, or Firm* — Procopio, Cory, Hargreaves & Savitch LLP (57) ABSTRACT

Provided is a steering assistance device 1, wherein and a demarcation line detection unit 100 detects left and right lane demarcation lines for a lane in which a vehicle is travelingtravels. An assistance unit 11 performs steering assistance for of the vehicle so that the vehicle travels parallel to the left and right lane demarcation lines. If the vehicle is between the left and right lane demarcation lines and the angle formed by the a direction of travel of the vehicle and a line along the center between the left and right lane demarcation lines is equal to or less than a prescribed angle, a steering control unit 102 stops the steering assistance for of the vehicle by the assistance unit 11.

5 Claims, 7 Drawing Sheets

(58) Field of Classification Search
USPC .......................................................... 701/41
See application file for complete search history.

(56) References Cited

U.S. PATENT DOCUMENTS

| | | | |
|---|---|---|---|
| 2006/0142921 A1 | 6/2006 | Takeda | |
| 2006/0142922 A1 | 6/2006 | Ozaki et al. | |
| 2006/0217886 A1* | 9/2006 | Fujimoto | G08G 1/165 701/300 |
| 2009/0005933 A1* | 1/2009 | Tabata | B60T 8/17557 701/42 |
| 2010/0114431 A1* | 5/2010 | Switkes | B60T 8/17557 701/41 |
| 2011/0015850 A1 | 1/2011 | Tange et al. | |
| 2014/0300731 A1* | 10/2014 | Takemura | B60W 50/06 348/116 |
| 2015/0166063 A1 | 6/2015 | Ishihara | |
| 2015/0259008 A1* | 9/2015 | Seguchi | F02D 29/02 701/41 |
| 2016/0107640 A1* | 4/2016 | Takahashi | B60T 8/1755 701/41 |
| 2016/0152237 A1* | 6/2016 | Takahashi | B62D 5/0463 701/41 |
| 2017/0151982 A1* | 6/2017 | Fujii | G06K 9/6267 |
| 2017/0313309 A1* | 11/2017 | Morales Teraoka | B60W 10/20 |
| 2018/0186405 A1* | 7/2018 | Nakahara | B62D 5/046 |
| 2018/0257648 A1 | 9/2018 | Katoh et al. | |
| 2018/0297594 A1* | 10/2018 | Takahashi | G05D 1/0246 |
| 2019/0168752 A1 | 6/2019 | Suzuki | |

FOREIGN PATENT DOCUMENTS

| | | |
|---|---|---|
| EP | 2894079 A1 | 7/2015 |
| EP | 3495240 A | 6/2019 |
| JP | H11-105728 A | 4/1999 |
| JP | 2000-033860 A | 2/2000 |
| JP | 2002-154451 A | 5/2002 |
| JP | 2004-070853 A | 3/2004 |
| JP | 2006-182308 A | 7/2006 |
| JP | 2006-206032 A | 8/2006 |
| JP | 2007-017451 A | 1/2007 |
| JP | 2007018451 A | 1/2007 |
| JP | 2008-033807 A | 2/2008 |
| JP | 2010-023756 A | 2/2010 |
| JP | 2012-035794 A | 2/2012 |
| JP | 2015-116919 A | 6/2015 |
| WO | 2017-064981 A1 | 4/2017 |

OTHER PUBLICATIONS

Office Action for related JP App. No. 2016152052 dated Jul. 21, 2020. English translation provided; 7 pages.

International Search Report and Written Opinion for related International Application No. PCT/JP2017/027296, dated Oct. 24, 2017; 10 pages; English translation of ISR provided.

Extended European Search Report for related European Application No. 17836856.9, dated Jul. 3, 2019; 9 pages.

* cited by examiner

TRAVEL LANE    ADJACENT LANE

STEERING ASSISTANCE DEVICE AND STEERING ASSISTANCE METHOD

CROSS-REFERENCE TO RELATED APPLICATIONS

This application is a U.S. National Stage entry of PCT Application No: PCT/JP2017/027296 filed on Jul. 27, 2017, which claims priority to Japanese Patent Application No. 2016-152052, filed Aug. 2, 2016, the contents of which are incorporated herein by reference.

TECHNICAL FIELD

The present disclosure relates to a steering assistance device and a steering assistance method, and particularly relates to a technique for assisting steering for driving a vehicle along a lane.

BACKGROUND ART

Various lane maintaining assistance technologies for assisting driving of a vehicle along a lane have been proposed. For example, Patent Document 1 discloses a technique of controlling an angle deviation of a direction of travel of a host vehicle to be small with respect to a travel lane. Patent Document 2 discloses a technique of stopping a return steering torque when a steering angle necessary for matching a target travel line, to which a driver guides a vehicle, with a travel line of the vehicle is equal to or less than a prescribed threshold angle.

PRIOR ART REFERENCE

Patent Reference

Patent Document 1: JP-A-2010-023756
Patent Document 2: JP-A-1-105728

SUMMARY OF INVENTION

Problems to be Solved

A lane maintaining assistance technique assisting travel of a vehicle along a lane can also be said as a technique correcting a direction of travel of the vehicle. Therefore, when using the technique, in some cases, a torque in a direction opposite to steering of a driver of the vehicle may be applied to a steering for maintaining the lane. Since this may cause deterioration of driving feeling of the driver, it is preferable that the lane maintaining assistance technique can be stopped when the lane maintaining assistance technique is not necessary.

The technique disclosed in Patent Document 2 discloses a stop condition of the lane maintaining assistance technique. However, from the viewpoint of lane maintaining assistance, it is sufficient that the vehicle can travel in the lane, and it is not always necessary to match the travel line of the vehicle with a specific target travel line.

The present disclosure has been made in view of these problems, and an object of the present disclosure is to provide a technique for balancing safety improvement of a vehicle and prevention of deterioration of driving feeling of a driver due to lane maintaining assistance.

Means for Solving the Problems

A first aspect of the present disclosure is a steering assistance device. The device includes: a demarcation line detection unit configured to detect left and right lane demarcation lines in a lane in which a vehicle travels; an assistance unit configured to perform steering assistance of the vehicle such that the vehicle travels parallel to the left and right lane demarcation lines; and a steering control unit configured to stop the steering assistance of the vehicle performed by the assistance unit in a case where the vehicle is between the left and right lane demarcation lines and an angle formed by a direction of travel of the vehicle and a line along a center between the left and right lane demarcation lines is equal to or less than a prescribed angle.

The steering assistance device may further include a horizontal velocity measurement unit configured to calculate a horizontal velocity, which is a velocity component of the vehicle in a direction perpendicular to the lane, and the steering control unit may proceed with the steering assistance of the vehicle performed by the assistance unit in a case where the horizontal velocity is equal to or greater than a prescribed velocity, even if the angle between the direction of travel of the vehicle and the line along the center between the left and right lane demarcation lines is equal to or less than the prescribed angle and the vehicle is between the left and right lane demarcation lines.

The steering assistance device may further include an imaging unit configured to capture an image of a front side in the direction of travel of the vehicle, the demarcation line detection unit may detect the left and right lane demarcation lines from the image captured by the imaging unit, and the horizontal velocity measurement unit may calculate the horizontal velocity based on a moving velocity of imaged positions of the lane demarcation line in the image.

A second aspect of the present disclosure is a steering assistance method performed by a processor. The method includes steps of: detecting left and right lane demarcation lines in a lane in which a vehicle travels; performing steering assistance of the vehicle such that the vehicle travels in parallel with the left and right lane demarcation lines; and stopping the steering assistance of the vehicle in a case where the vehicle is between the left and right lane demarcation lines and an angle between a direction of travel of the vehicle and a line along a center between the left and right lane demarcation lines is equal to or less than a prescribed angle.

Advantageous Effects of Invention

According to the steering assistance device and the steering assistance method according to the present disclosure, it is possible to balance safety improvement of a vehicle and prevention of deterioration of driving feeling of a driver due to lane maintaining assistance.

MODE FOR CARRYING OUT THE INVENTION

Overview of Embodiment

An overview of an embodiment will be described. The steering assistance device according to the embodiment is a so-called device for lane maintaining assistance that assists steering of a vehicle mounted with the steering assistance device, such that the vehicle travels in parallel along a lane. Specifically, the steering assistance device according to the embodiment detects that the vehicle is to deviate from the lane in which the vehicle travels and that the vehicle has deviated from the lane in which the vehicle travels, applies a steering force in a direction returning the vehicle to the original lane, and sets a direction of the vehicle to be parallel to the lane when the vehicle moves to the vicinity of a lane center. As described above, by mounting the steering assistance device according to the embodiment to the vehicle, it is possible to prevent the vehicle from deviating from the lane and to assist the vehicle to travel in parallel with the lane, thereby safety of traveling can be further improved.

The steering assistance device for achieving lane maintaining assistance applies a torque in a direction opposite to operation on a steering performed by the driver of the vehicle. That is, the steering assistance device applies a force to the steering in a direction opposite to operation of the driver. If the vehicle moves past the lane center when the vehicle moves from an edge of the lane to the lane center due to lane maintaining assistance, the lane maintaining assistance functions in the opposite direction.

If such situation continues, the force in the direction opposite to operation of the driver is applied to the steering for many times, which is unpreferable. Therefore, the steering assistance device for achieving the lane maintaining assistance function is useful from the viewpoint of improving safety during travel of the vehicle, but is not necessarily preferable from the viewpoint of improving driving feeling of the driver.

Therefore, the steering assistance device according to the embodiment analyzes the image capturing the vehicle front side including the lane in which the vehicle travels, and appropriately ends the lane maintaining assistance function on condition that the vehicle becomes parallel inside the lane. Thus, since the steering assistance device according to the embodiment performs lane maintaining assistance in accordance with the need of lane maintaining assistance, safety of driving of the vehicle can be improved, and deterioration of driving feeling of the driver due to the lane maintaining assistance can be prevented.

<Functional Configuration of Steering Assistance Device 1>

Although the steering assistance device according to the embodiment functions as a power assistance and a lane maintaining assistance of the vehicle, a functional configuration of a steering assistance device 1 for realizing the lane maintaining assistance function of the vehicle will be mainly described below.

Figure 1:
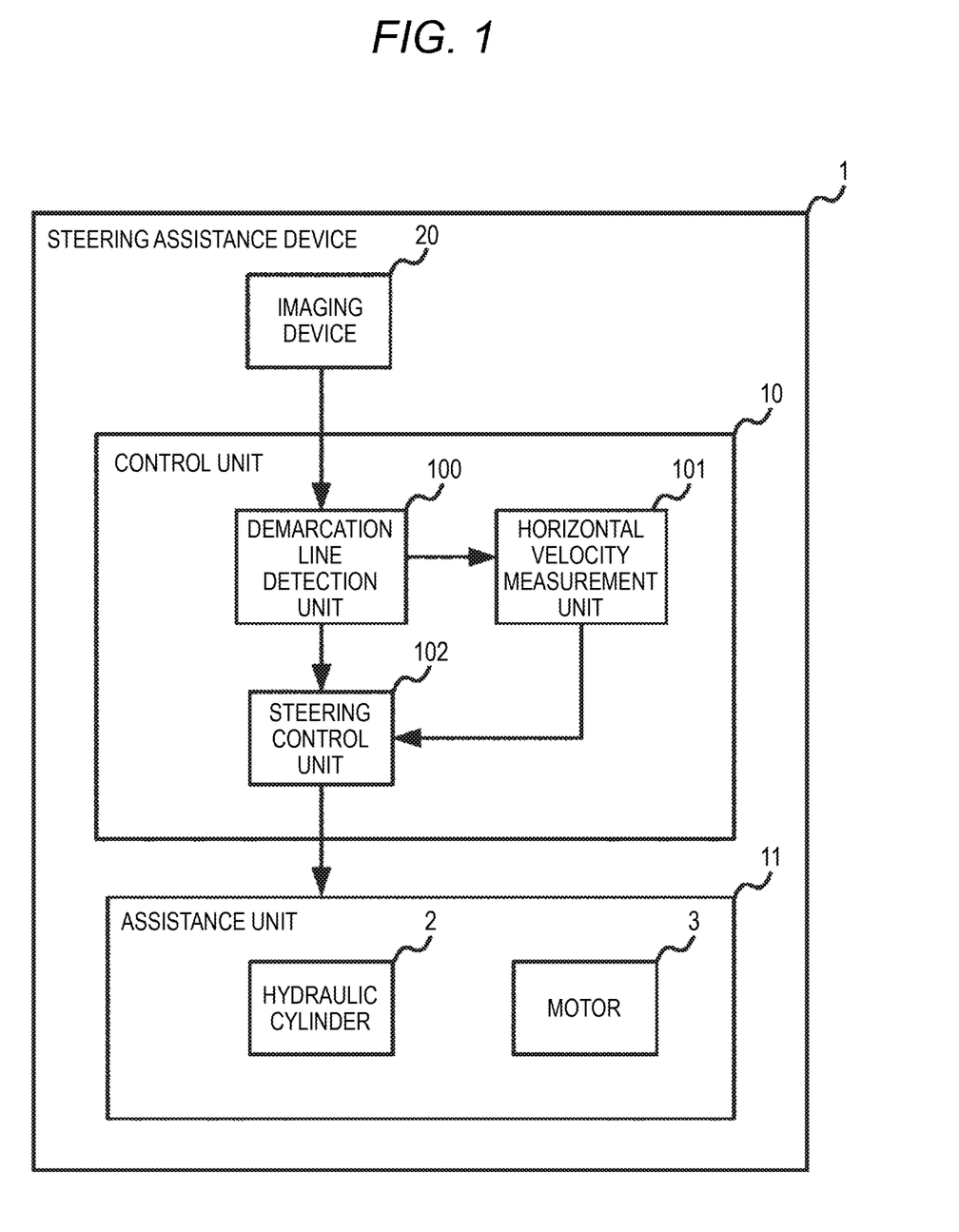
FIG. 1 is a diagram schematically illustrating a functional configuration of a steering assistance device according to an embodiment.

FIG. 1 is a diagram schematically illustrating the functional configuration of the steering assistance device 1 according to the embodiment.

The steering assistance device 1 includes a control unit 10, an assistance unit 11, and an imaging device 20. The control unit 10 is a calculation resource including a central processing unit (CPU), a memory, and the like (not shown), and realizes functions of the demarcation line detection unit 100, the horizontal velocity measurement unit 101, and the steering control unit 102 by executing programs.

The imaging device 20 is an in-vehicle camera mounted on a vehicle, and functions as an imaging unit in the steering assistance device 1. The imaging device 20 captures an image of the front side in the direction of travel of the vehicle, including the lane in which the vehicle travels. The demarcation line detection unit 100 acquires the image captured by the imaging device 20. The demarcation line detection unit 100 detects left and right lane demarcation lines in the lane in which the vehicle travels by analyzing the acquired image.

The control unit 10 analyzes the image captured by the imaging device 20 to calculate a curvature of the lane in which the vehicle travels. The control unit 10 calculates a target steering angle necessary for the vehicle to travel in the lane from the calculated curvature. The control unit 10 controls a hydraulic cylinder 2 and a motor 3 based on the calculated target steering angle to realize lane maintaining assistance on the vehicle.

The assistance unit 11 is a mechanism assisting the driver of the vehicle to move a steering wheel by operating the steering, and includes the hydraulic cylinder 2 and the motor 3. The hydraulic cylinder 2 generates a torque for assisting steering of the vehicle by a hydraulic pressure. The motor 3 generates a torque for assisting steering of the vehicle by an electric power.

The hydraulic cylinder 2 mainly provides a power assistance function for transmitting movement of the steering wheel to the steered wheel under control of the control unit 10. On the other hand, the motor 3 mainly provides the lane maintaining assistance function for the vehicle to travel along the travel lane under control of the control unit 10.

The horizontal velocity measurement unit 101 calculates a horizontal velocity, which is a velocity component of the vehicle in a direction perpendicular to the lane. Specifically, the horizontal velocity measurement unit 101 calculates the horizontal velocity of the vehicle based on a moving velocity of the imaged positions of the lane demarcation line detected by the demarcation line detection unit 100 in the image captured by the imaging device 20.

The steering control unit 102 controls the assistance unit 11 to perform steering assistance of the vehicle such that the vehicle travels along a center between the left and right lane demarcation lines. Hereinafter, a condition for the steering control unit 102 to cause the assistance unit 11 to start steering assistance and a condition for the steering control unit 102 to cause the assistance unit 11 to stop steering assistance will be described.

(Start Condition and Stop Condition of Steering Assistance)

Figure 2A:
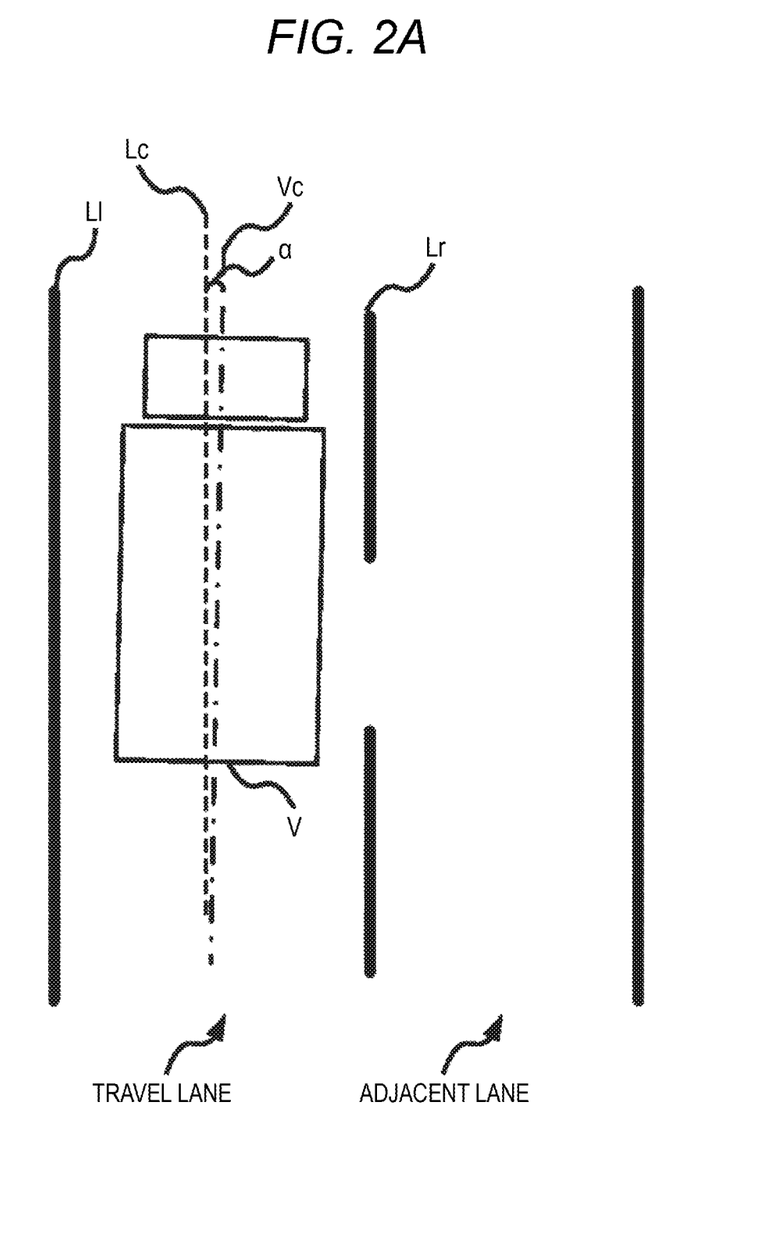
FIG. 2A is a diagram illustrating a start condition and a stop condition of steering assistance according to the embodiment.
Figure 2B:
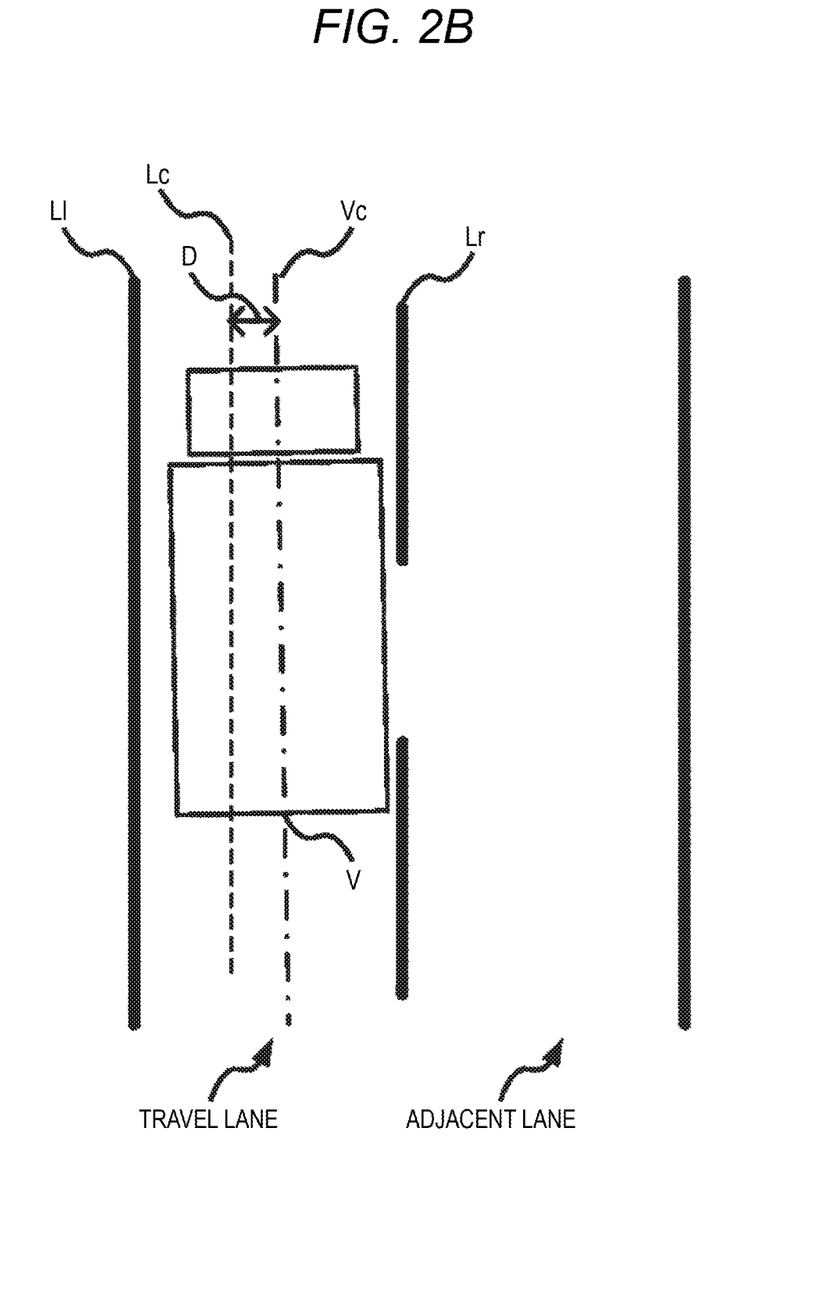
FIG. 2B is a diagram illustrating the start condition and the stop condition of steering assistance according to the embodiment.
Figure 2C:
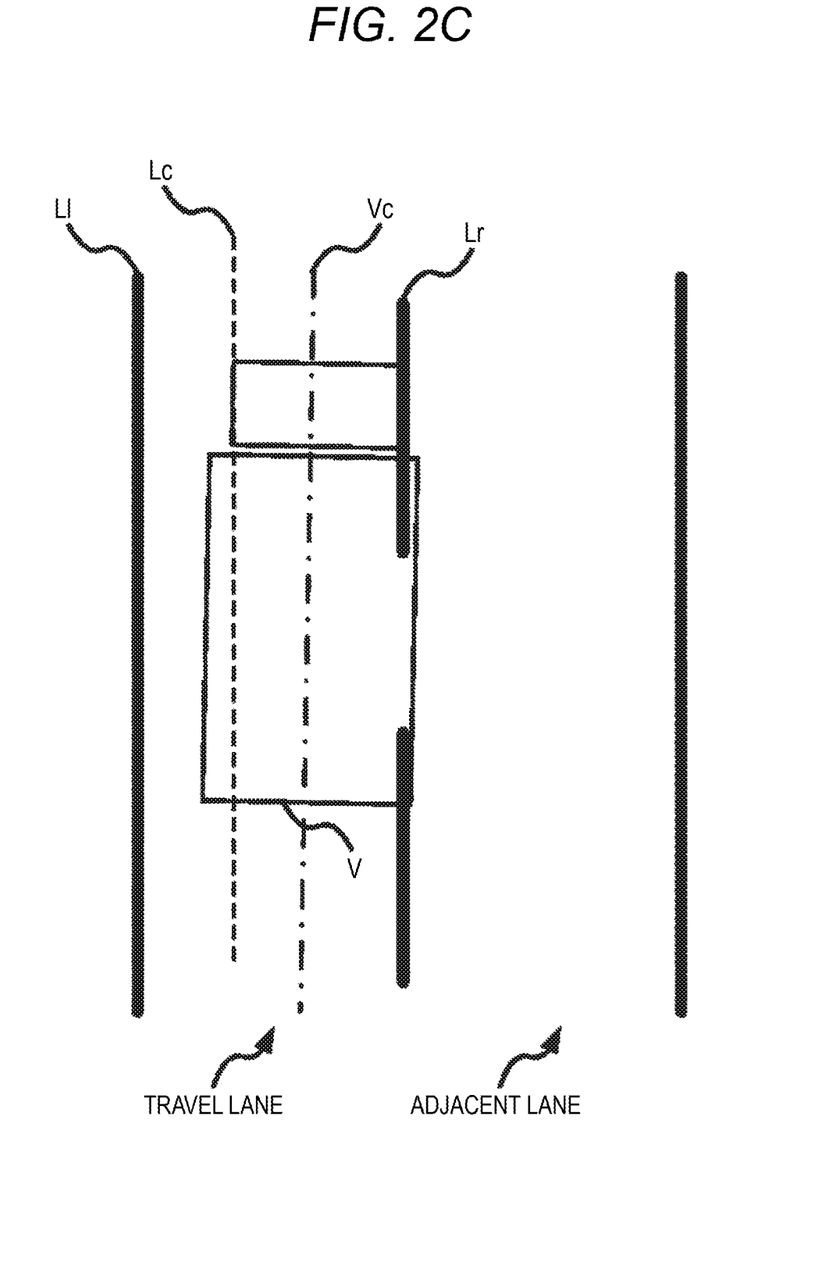
FIG. 2C is a diagram illustrating the start condition and the stop condition of steering assistance according to the embodiment.

FIGS. 2A to 2C are diagrams illustrating the start condition and the stop condition of steering assistance according to the embodiment. The start condition and the stop condition of steering assistance will be described below with reference to FIGS. 2A to 2C.

Steering assistance according to the embodiments is roughly divided into two stages. The two stages include: a steering assistance first stage in which the vehicle is directed from an edge to the center of the lane; and a steering assistance second stage in which the direction of travel of the vehicle is set parallel to the lane. The start condition and the stop condition related to the steering assistance second stage will be mainly described below.

In the present specification, the term "lane demarcation line L" means a line drawn on a road for partitioning the lane in which the vehicle V travels. The lane demarcation line includes a white solid line, a white broken line, a yellow solid line, and the like, which are inclusively described as the lane demarcation lines L in the present specification. For convenience of description, a lane demarcation line located on a left side of the vehicle V with respect to the direction of travel of the vehicle V is referred to as a first lane demarcation line Ll, and a lane demarcation line located on a right side of the vehicle V is referred to as a second lane demarcation line Lr, both of which are collectively referred to as the lane demarcation lines L when it is unnecessary to distinguish between them.

In FIGS. 2A to 2C, a broken line indicated by the reference sign Lc is a lane central line Lc along the center between the left and right lane demarcation lines L. The lane central line Lc is a virtual line rather than a line actually drawn on a road surface. A one-dot chain line indicated by the reference sign Vc is a vehicle central line Vc, which is a bisector of the vehicle V in a lateral direction. The vehicle central line Vc is parallel to the direction of travel of the vehicle V. Similarly as the lane central line Lc, the vehicle central line Vc is a virtual line rather than an actually existing line.

[Start Condition of Steering Assistance Second Stage]

For example, when the vehicle V travels onto either one of the left and right lane demarcation lines L for some reason, or changes the lane from an adjacent lane, the vehicle V is moved toward the lane central line Lc in order to maintain the lane. In such case, the horizontal velocity of the vehicle V is directed from either one of the left and right lane demarcation lines L toward the lane central line Lc.

In a case where the horizontal velocity is large, the vehicle V may pass through the lane central line Lc and move to a region on an opposite side of the lane with respect to the lane central line Lc. Then, assistance in a direction directing the vehicle V to the lane central line Lc functions due to lane maintaining assistance, which may cause unstable travel.

Thus, the steering control unit 102 starts steering assistance of the vehicle V performed by the assistance unit 11 in a case where the horizontal velocity of the vehicle V becomes equal to or more than a prescribed velocity and a distance of the center of the vehicle V from the center between the left and right lane demarcation lines L becomes a prescribed distance. This will be described in more detail below.

FIGS. 2A and 2B are diagrams for illustrating the start condition of the steering assistance second stage. In FIG. 2A, an angle α (0≤α<90°) is an angle formed by the vehicle central line Vc and the lane central line Lc, and is an angle formed by the direction of travel of the vehicle V and the lane central line Lc. For example, when the vehicle V is traveling in parallel with the lane, the angle α is 0°. In FIG. 2B, a distance D between the lane central line Lc and the vehicle central line Vc indicates a distance between the center of the vehicle V and the lane central line Lc.

The angle α shown in FIG. 2A is also an index indicating a magnitude of the horizontal velocity of the vehicle V. Here, it is assumed that the vehicle V is not blown in the horizontal direction by strong horizontal wind or the like. In this case, assuming that the vehicle V is traveling at S kilometers per hour, the velocity in the direction along the lane of the vehicle V is S cos(α) kilometers per hour, and the velocity in the direction perpendicular to the lane of the vehicle V is S sin(α) kilometers per hour. Therefore, in the range 0≤α<90°, the horizontal velocity of the vehicle V has a positive correlation with the angle α, and the horizontal velocity is 0 when α=0.

Here, it is assumed that the vehicle V is a truck and the vehicle V is traveling on a highway, and the vehicle V is traveling from a position away from the lane central line Lc toward the lane central line Lc. At this time, a condition for the center of the vehicle V to reach the vehicle central line Vc after a prescribed time (for example, after 10 seconds) is considered.

In a case where the vehicle V is a truck, a vehicle width of the vehicle V is about 2.5 meters, and a width of the lane on the highway is about 3.5 meters. Assuming that the vehicle V is traveling in the lane in a manner overlapping the edge of the lane, the center of the vehicle V is at a position 0.5 meters away from the lane central line Lc. At this time, the condition for the center of the vehicle V to reach the lane central line Lc within 10 seconds is that the horizontal velocity of the vehicle V is equal to or greater than 0.05 meters per second (equal to or greater than 0.18 kilometers per hour).

Since it is assumed that the vehicle V is traveling on a highway, the velocity S of the vehicle V is assumed as 80 kilometers per hour. At this time, the condition for the horizontal velocity of the vehicle V to be equal to or greater than 0.18 kilometers per hour is that sin(α) is equal to or greater than 0.18/80=0.00225. This corresponds to that a is approximately equal to or greater than 13°. Therefore, when the angle α formed by the vehicle central line Vc and the lane central line Lc is equal to or greater than 13°, a sufficient condition is satisfied for the center of the vehicle V to reach the lane center within 10 seconds when the vehicle V travels in the lane in a manner overlapping the edge of the lane.

Here, it is assumed that the angle α formed by the vehicle central line Vc and the lane central line Lc is 6.5°, which is a half of 13° as the sufficient condition for the center of the vehicle V traveling on the edge of the lane to reach the lane central line Lc within 10 seconds. In this case, the velocity of the horizontal velocity of the vehicle V is 80× sin(6.5) ≈0.11 kilometers per hour (approximately 0.03 meters per second). That is, the vehicle V moves by 0.3 meters per 10 seconds in a direction perpendicular to the lane. Therefore, when α is 6.5°, assuming that the vehicle V is traveling 0.3 meters away from the lane center, the center of the vehicle V reaches the lane central line Lc after 10 seconds.

Therefore, the steering control unit 102 according to the embodiment adopts 0.11 kilometers per hour as an example of the "prescribed velocity" which is a condition for causing the assistance unit 11 to start the steering assistance second stage of the vehicle V, and adopts 0.3 meters as an example of the "prescribed distance". That is, the steering control unit 102 starts the steering assistance second stage of the vehicle V by the assistance unit 11 in a case where the horizontal velocity of the vehicle V is equal to or greater than 0.11 kilometers per hour and the center of the vehicle V approaches equal to or greater than 0.3 meters from the center between the left and right lane demarcation lines L.

More specifically, the steering control unit 102 controls the assistance unit 11 such that the angle α formed by the direction of travel of the vehicle V and the lane central line Lc along the center of the left and right lane demarcation lines L decreases with time. Thereby, the angle α decreases as the center of the vehicle V approaches the lane central line Lc, which prevents the vehicle V from going beyond the lane central line Lc. As a result, the vehicle V can be prevented from moving toward the opposite side due to excessive turning round, and the behavior of the vehicle V can be stabilized.

The values of the "prescribed time", the "prescribed velocity", and the "prescribed distance" are merely examples, and these values may be determined in consideration of the vehicle width and the power performances of the vehicle V, the width of the lane assumed as a roadway in which the vehicle V travels, and the like.

[Stop Condition of Steering Assist Second Stage]

Next, the stop condition of the above-described steering assistance second stage will be described.

If the angle α shown in FIG. 2A is sufficiently small, it can be considered that the vehicle V is traveling in parallel with the lane. Therefore, the steering control unit 102 stops the steering assistance of the vehicle V performed by the assistance unit 11 in a case where the angle α formed by the travel direction of the vehicle V and the lane central line Lc along the center between the left and right lane demarcation lines L is equal to or less than a prescribed angle $α_T$.

Here, the "prescribed angle $α_T$" is an angle for lane maintaining determination to which the steering control unit 102 refers for determining whether or not the vehicle V can continue traveling in the lane, and is, for example, 5°, which is an angle smaller than 6.5° as described above. The steering control unit 102 may adaptively change the "prescribed angle $α_T$" in accordance with the horizontal velocity of the vehicle V. Specifically, the steering control unit 102 may decrease the "prescribed angle $α_T$" as the horizontal velocity of the vehicle V increases.

The steering assistance device 1 according to the embodiment provides the steering assistance for realizing the lane maintaining assistance function. Therefore, even when the vehicle V travels in parallel with the lane, it cannot be regarded as "lane maintaining" if the vehicle V deviates from the lane as shown in FIG. 2C. Therefore, the steering control unit 102 also considers that the vehicle V is located between the left and right lane demarcation lines L as a condition for stopping the steering assistance of the vehicle V.

In summary, the steering assistance device 1 according to the embodiment stops the steering assistance of the vehicle V performed by the assistance unit 11 in a case where the angle α formed between the direction of travel of the vehicle V and the lane central line Lc along the center between the left and right lane demarcation lines L is equal to or less than the prescribed angle $α_T$. Thereby, the steering assistance by the assistance unit 11 is stopped in a case where the vehicle V can continue traveling in the lane, so that the torque in the direction opposite to an intention of the driver is not applied to the steering. As a result, deterioration of driving feeling of the driver can be suppressed.

Even if the angle α is equal to or less than the prescribed angle $α_T$, a case where the vehicle V goes out of the lane in an early stage or goes out of the lane from the opposite side beyond the lane central line Lc can be considered when the horizontal velocity of the vehicle V is large. The case where the horizontal velocity of the vehicle V is large is when the velocity of the vehicle V is large or when the vehicle V is blown in the horizontal direction by strong horizontal wind or the like.

In this way, even if the angle α formed between the direction of travel of the vehicle V and the lane central line Lc along the center between the left and right lane demarcation lines L is equal to or less than the prescribed angle $α_T$, the steering control unit 102 proceeds with the steering assistance of the vehicle V performed by the assistance unit 11 in a case where the horizontal velocity of the vehicle V is equal to or greater than the prescribed velocity $V_T$. As a result, it is possible to prevent the vehicle V from deviating from the lane. Examples of the "prescribed velocity $V_T$", which is referred to as a reference value of the horizontal velocity to determine whether or not the steering control unit 102 proceeds with the steering assistance, is 0.11 kilometers per hour.

<Processing Flow of Steering Assistance Process Performed by Steering Assistance Device 1>

Figure 3:
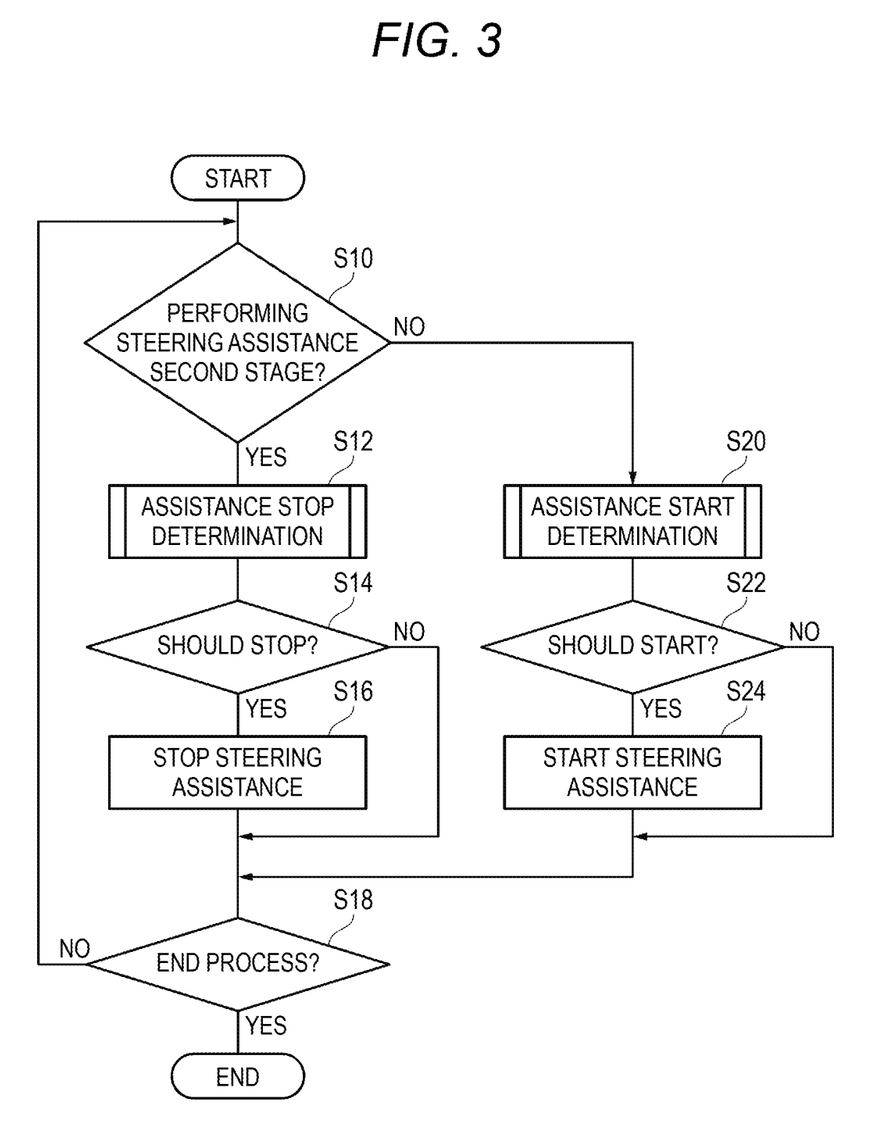
FIG. 3 is a flowchart illustrating a flow of control processing of steering assistance performed by the steering assistance device according to the embodiment.

FIG. 3 is a flowchart illustrating a flow of control processing of steering assistance performed by the steering assistance device 1 according to the embodiment. The processing in this flowchart is started, for example, when an engine of the vehicle V is started.

When the assistance unit 11 is performing the steering assistance second stage of the vehicle V (Yes in S10), the steering control unit 102 executes an assistance stop determination processing for determining whether or not to stop the steering assistance second stage of the vehicle V performed by the assistance unit 11 (S12). When determining that the steering assistance second stage of the vehicle V performed by the assistance unit 11 should be stopped (Yes in S14), the steering control unit 102 stops the steering assistance second stage of the vehicle V performed by the assistance unit 11 (S16). When determining that the steering assistance second stage of the vehicle V performed by the assistance unit 11 should not be stopped (No in S14), the steering control unit 102 proceeds with the steering assistance second stage of the vehicle V performed by the assistance unit 11 rather than stopping the steering assistance second stage.

When the assistance unit 11 is not performing the steering assistance second stage of the vehicle V (No in S10), the steering control unit 102 executes an assistance start determination processing for determining whether or not to start the steering assistance second stage of the vehicle V performed by the assistance unit 11 (S20). When determining that the steering assistance second stage of the vehicle V performed by the assistance unit 11 should be started (Yes in S22), the steering control unit 102 starts the steering assistance second stage of the vehicle V performed by the assistance unit 11 (S24). When determining that the steering assistance second stage of the vehicle V performed by the assistance unit 11 should not be started (No in S22), the steering control unit 102 proceeds with a stopped state of the steering assistance second stage of the vehicle V performed by the assistance unit 11 rather than starting the steering assistance second stage.

The process returns to S10 and the above processing continues in a case where there is no particular situation in which the control processing of the steering assistance should be ended, such as that the engine of the vehicle V is stopped (No in S18). The processing in the flowchart is ended in a case where the control processing of steering assistance is to be ended (Yes in S18).

Figure 4:
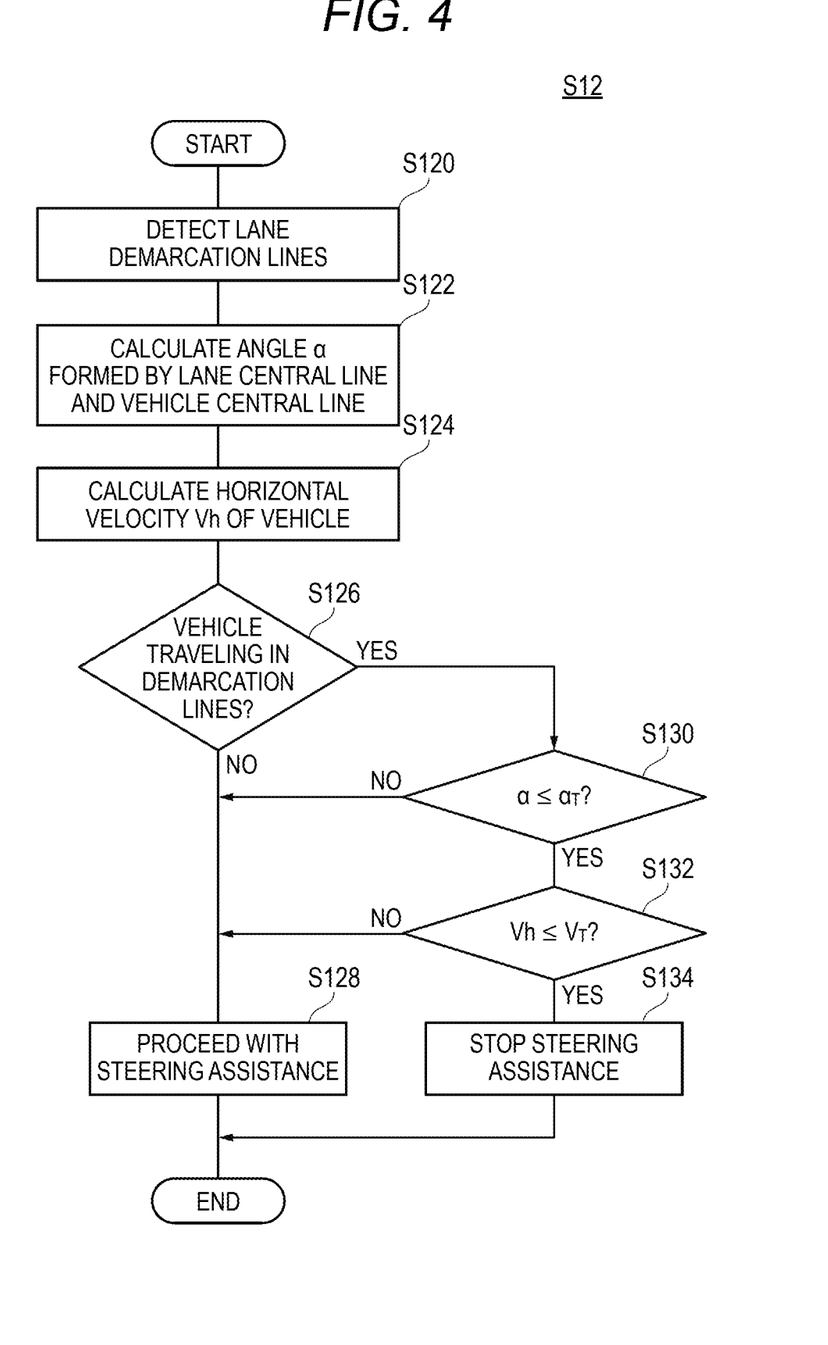
FIG. 4 is a flowchart illustrating a flow of assistance stop determination processing performed by the steering control unit according to the embodiment.

FIG. 4 is a flowchart illustrating a flow of assistance stop determination processing performed by the steering control unit 102 according to the embodiment, and is a diagram for illustrating in detail the process of S12 in FIG. 3.

The demarcation line detection unit 100 detects the left and right lane demarcation lines L in the lane in which the vehicle V travels by analyzing the image captured by the imaging device 20 (S120). The steering control unit 102 calculates the angle α formed by the lane central line Lc along the center between the left and right lane demarcation lines L and the vehicle central line Vc along the center of the vehicle V based on the lane demarcation lines L detected by the demarcation line detection unit 100 (S122). The horizontal velocity measurement unit 101 calculates the horizontal velocity Vh of the vehicle based on the moving velocity of the imaged positions of the lane demarcation line detected by the demarcation line detection unit 100 in the image captured by the imaging device 20 (S124).

When the vehicle V is not traveling in the lane demarcation lines L (No in S126), the steering control unit 102 proceeds with the steering assistance second stage of the vehicle V performed by the assistance unit 11 (S128). Even if the vehicle V is traveling in the lane partition lines L (Yes in S126), the steering control unit 102 proceeds with the steering assist second stage of the vehicle V performed by the assistance unit 11 (S128) in a case where the angle α formed by the lane center line Lc and the vehicle center line Vc is not equal to or less than the predetermined angle $α_T$ (No in S130).

Even if the vehicle V is traveling in the lane demarcation lines L (Yes in S126) and the angle α formed by the lane central line Lc and the vehicle central line Vc is equal to or less than the prescribed angle $α_T$ (Yes in S130), the steering control unit 102 proceeds with the steering assistance second stage of the vehicle V performed by the assistance unit 11 (S128) in a case where the horizontal velocity Vh of the vehicle V is not equal to or less than the prescribed velocity $V_T$ (No in S132).

The steering control unit 102 stops the steering assistance second stage of the vehicle V performed by the assistance unit 11 (S134) in a case where the vehicle V is traveling in the lane demarcation lines L (Yes in S126), the angle α formed by the lane central line Lc and the vehicle central line Vc is equal to or less than the prescribed angle $α_T$ (Yes in S130), and the horizontal velocity Vh of the vehicle V is equal to or less than the prescribed velocity $V_T$ (Yes in S132).

Figure 5:
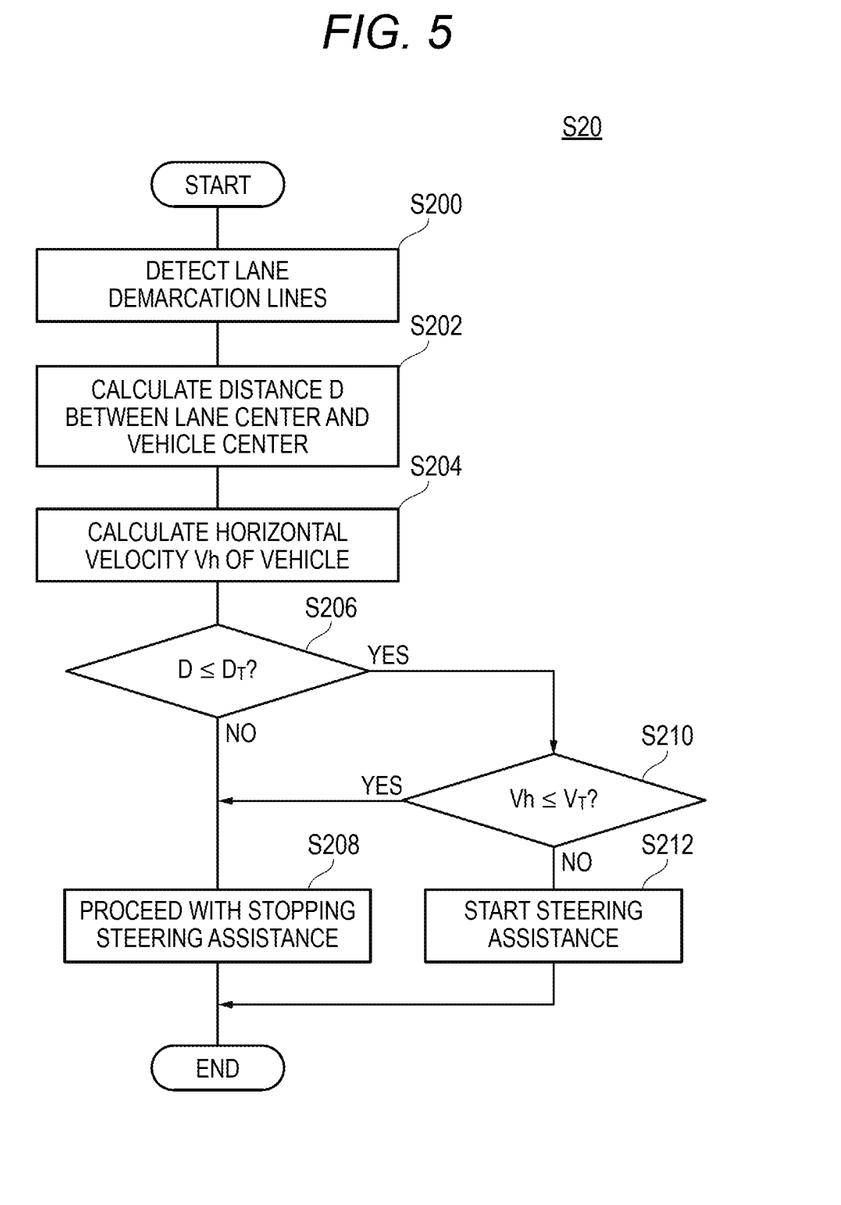
FIG. 5 is a flowchart illustrating a flow of assistance start determination processing performed by the steering control unit according to the embodiment.

FIG. 5 is a flowchart illustrating a flow of assistance start determination processing executed by the steering control unit 102 according to the embodiment, and is a diagram for illustrating in detail the processing of S20 in FIG. 3.

The demarcation line detection unit 100 detects the left and right lane demarcation lines L in the lane in which the vehicle V travels by analyzing the image captured by the imaging device 20 (S200). The demarcation line detection unit 100 calculates the distance D between the lane central line Lc along the center between the left and right lane demarcation lines L and the vehicle central line Vc along the center of the vehicle V based on the lane demarcation lines L detected by the demarcation line detection unit 100 (S202). The horizontal velocity measurement unit 101 calculates the horizontal velocity Vh of the vehicle based on the moving velocity of the imaged positions of the lane demarcation line detected by the demarcation line detection unit 100 in the image captured by the imaging device 20 (S204).

The steering control unit 102 proceeds with a state where the steering assistance second stage of the vehicle V performed by the assistance unit 11 is stopped (S208) in a case where the distance D between the lane central line Lc along the center between the left and right lane demarcation lines L and the vehicle central line Vc along the center of the vehicle V is larger than the prescribed distance Dr (No in S206). Even if the distance D between the lane central line Lc along the center between the left and right lane demarcation lines L and the vehicle central line Vc along the center of the vehicle V is equal to or less than the prescribed distance Dr (Yes in S206), the steering control unit 102 proceeds with the state where the steering assistance second stage of the vehicle V performed by the assistance unit 11 is stopped (S208) in a case where the horizontal velocity Vh of the vehicle V is equal to or less than the prescribed velocity $V_T$ (Yes in S210).

The steering control unit 102 starts the steering assistance second stage of the vehicle V performed by the assistance unit 11 (S212) in a case where the distance D between the lane central line Lc along the center between the left and right lane demarcation lines L and the vehicle central line Vc along the center of the vehicle V is equal to or less than the prescribed distance Dr (Yes in S206) and the horizontal velocity Vh of the vehicle V is larger than the prescribed velocity $V_T$ (No in S210).

As described above, according to the steering assistance device 1 according to the present disclosure, it is possible to balance safety improvement of the vehicle V and prevention of deterioration of driving feeling of the driver due to lane maintaining assistance. Also, the vehicle V can be prevented from moving toward the opposite side due to excessive turning round which is caused by steering assistance functioning for preventing lane departure. As a result, the behavior of the vehicle V can be stabilized.

The steering assistance device 1 stops the steering assistance of the vehicle performed by the assistance unit in a case where the vehicle is between the left and right lane demarcation lines and the angle between the direction of travel of the vehicle and the line along the center between the left and right lane demarcation lines is equal to or less than the prescribed angle. Therefore, if the vehicle V is traveling in the lane, lane maintaining assistance is stopped, and thus no torque is applied to perform steering assistance contrary to steering of the driver. As a result, deterioration of driving feeling of the driver can be prevented.

On the other hand, even if the vehicle V is between the left and right lane demarcation lines L and the angle formed by the travel direction of the vehicle V and the line along the center of the left and right lane demarcation lines L is equal to or less than a prescribed angle, the lane maintaining assistance is not stopped in a case where the horizontal velocity of the vehicle V is large. Thereby, since lane maintaining assistance functions before the vehicle V deviates from the lane, safety of traveling of the vehicle V can be improved.

Although the steering assistance device and the steering assistance method according to the present disclosure have been described above using the embodiment, the technical scope of the present disclosure is not limited to the scope described in the above embodiment. It is apparent to persons skilled in the art that various alterations and improvements can be added to the above-described embodiment. It is also apparent from the scope of the claims that the embodiments added with such alterations or improvements can be included in the technical scope of the present disclosure.

The present application is based on Japanese Patent Application No. 2016-152052 filed on Aug. 2, 2016, contents of which are incorporated herein as reference.

INDUSTRIAL APPLICABILITY

The steering assistance device and the steering assistance method according to the present disclosure are useful for balancing safety improvement of a vehicle and prevention of deterioration of driving feeling of a driver due to lane maintaining assistance.

The steering assistance device and the steering assistance method according to the present disclosure may be specified by the following aspects.

[Aspect 1]

A steering assistance device including:

a demarcation line detection unit configured to detect left and right lane demarcation lines in a lane in which a vehicle travels;

a horizontal velocity measurement unit configured to calculate a horizontal velocity, which is a velocity component of the vehicle in a direction perpendicular to the lane;

an assistance unit configured to perform steering assistance of the vehicle such that the vehicle travels parallel to the left and right lane demarcation lines; and a steering control unit configured to start the steering assistance of the vehicle performed by the assistance unit in a case where the horizontal velocity is equal to or greater than a prescribed velocity and a center of the vehicle is separated from a center between the left and right lane demarcation lines by equal to or greater than a prescribed distance.

[Aspect 2]

The steering assistance device according to Aspect 1, further including:

an imaging unit configured to capture an image of a front side in the direction of travel of the vehicle, wherein the demarcation line detection unit detects the left and right lane demarcation lines from the image captured by the imaging unit, and wherein the horizontal velocity measurement unit calculates the horizontal velocity based on a moving velocity of imaged positions of the lane demarcation line in the image.

[Aspect 3]

A steering assistance method performed by a processor, the steering assistance method including steps of:

detecting left and right lane demarcation lines in a lane in which a vehicle travels;

calculating a horizontal velocity, which is a velocity component of the vehicle in a direction perpendicular to the lane; and starting steering assistance of the vehicle such that the vehicle travels in parallel with the left and right lane demarcation lines in a case where a center of the vehicle is separated from a center between the left and right lane demarcation lines by equal to or greater than a prescribed distance and the horizontal velocity is equal to or greater than a prescribed velocity.

REFERENCE SIGNS LIST

1 Steering assistance device
2 Hydraulic cylinder
3 Motor
10 Control unit
11 Assistance unit
100 Demarcation line detection unit
101 Horizontal velocity measurement unit
102 Steering control unit
20 Imaging device
SS Steering assistance system
V Vehicle

The invention claimed is:

1. A steering assistance device configured to perform steering assistance of a vehicle such that the vehicle travels parallel to left and right lane demarcation lines in a lane in which the vehicle travels, the steering assistance device comprising:

a memory configured to store instructions; and
a processor configured to execute the instructions stored in the memory to:
detect the left and right lane demarcation lines;
stop the steering assistance of the vehicle performed in a case where the vehicle is between the left and right lane demarcation lines and an angle formed by a direction of travel of the vehicle and a line along a center between the left and right lane demarcation lines is equal to or less than a prescribed angle;
calculate a horizontal velocity, which is a velocity component of the vehicle in a direction perpendicular to the lane; and
proceed with the steering assistance of the vehicle in a case where the horizontal velocity is equal to or greater than a prescribed velocity, even if the angle between the direction of travel of the vehicle and the line along the center between the left and right lane demarcation lines is equal to or less than the prescribed angle and the vehicle is between the left and right lane demarcation lines,
wherein the stopping of the steering assistance is performed when the angle between the direction of travel of the vehicle and the line along the center between the left and right lane demarcation lines is equal to or less than the prescribed angle and the horizontal velocity is less than the prescribe velocity.

2. The steering assistance device according to claim 1, further comprising:

a camera configured to capture an image of a front side in the direction of travel of the vehicle,
wherein the processor is further configured to execute the instructions stored in the memory to:
detect the left and right lane demarcation lines from the image captured by the camera, and
calculate the horizontal velocity based on a moving velocity of imaged positions of the lane demarcation line in the image.

3. The steering assistance device according to claim 1, wherein the prescribed angle is an angle for lane maintaining determination that determines whether or not the vehicle continues traveling in the lane.

4. A steering assistance method performed by a processor, the steering assistance method comprising:

detecting left and right lane demarcation lines in a lane in which a vehicle travels;
performing steering assistance of the vehicle such that the vehicle travels in parallel with the left and right lane demarcation lines;
stopping the steering assistance of the vehicle in a case where the vehicle is between the left and right lane demarcation lines and an angle between a direction of travel of the vehicle and a line along a center between the left and right lane demarcation lines is equal to or less than a prescribed angle; and
proceeding with the steering assistance of the vehicle in a case where a horizontal velocity, which is a velocity component of the vehicle in a direction perpendicular to the lane, is equal to or greater than a prescribed velocity, even if the angle between the direction of travel of the vehicle and the line along the center between the left and right lane demarcation lines is equal to or less than the prescribed angle and the vehicle is between the left and right lane demarcation lines,
wherein the stopping of the steering assistance is performed when the angle between the direction of travel of the vehicle and the line along the center between the left and right lane demarcation lines is equal to or less than the prescribed angle and the horizontal velocity is less than the prescribe velocity.

5. The steering assistance method according to claim 4, wherein the prescribed angle is an angle for lane maintaining determination that determines whether or not the vehicle continues traveling in the lane.

\* \* \* \* \*